United States Patent
Ashdown et al.

(10) Patent No.: US 10,239,637 B2
(45) Date of Patent: Mar. 26, 2019

(54) SYSTEM AND METHOD FOR ARRESTING AND NEUTRALIZING UNMANNED VEHICLES

(71) Applicant: THE UNITED STATES OF AMERICA AS REPRESENTED BY THE SECRETARY OF THE AIR FORCE, Washington, DC (US)

(72) Inventors: Jonathan Ashdown, Greenwich, NY (US); Paul Sikora, Holland Patent, NY (US); Brendon Poland, Holland Patent, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 205 days.

(21) Appl. No.: 15/246,850

(22) Filed: Aug. 25, 2016

(65) Prior Publication Data

US 2017/0253348 A1    Sep. 7, 2017

Related U.S. Application Data

(60) Provisional application No. 62/302,863, filed on Mar. 3, 2016.

(51) Int. Cl.
  *B64F 1/02*   (2006.01)
  *B63B 35/00*  (2006.01)
  *F41H 7/00*   (2006.01)
  *F41H 13/00*  (2006.01)
  *B64C 39/02*  (2006.01)

(52) U.S. Cl.
  CPC .............. *B64F 1/02* (2013.01); *B63B 35/00* (2013.01); *F41H 7/005* (2013.01); *F41H 13/0006* (2013.01); *B63B 2035/006* (2013.01); *B64C 39/024* (2013.01); *B64C 2201/182* (2013.01)

(58) Field of Classification Search
  CPC ... B64C 2201/182; B64F 1/02; F41H 13/0006
  See application file for complete search history.

(56) References Cited

U.S. PATENT DOCUMENTS

| | | | |
|---|---|---|---|
| 3,827,019 A * | 7/1974 | Serbu ................... | A41F 1/002 135/117 |
| 9,061,102 B2 * | 6/2015 | Levien ................ | G05D 1/0011 |
| 9,085,362 B1 * | 7/2015 | Kilian .................... | B64F 1/02 |
| 9,524,648 B1 * | 12/2016 | Gopalakrishnan ...... | B64C 39/00 |
| 9,862,489 B1 * | 1/2018 | Weinstein ............. | B64C 39/024 |

(Continued)

*Primary Examiner* — Timothy D Collins
*Assistant Examiner* — Tye William Abell
(74) *Attorney, Agent, or Firm* — Joseph A. Mancini (57) ABSTRACT

The use of shielded material in a deployable vehicle arresting and containment device that, when used for the interception of an unmanned vehicle, effectively achieves RF isolation of that vehicle, breaking all external communications with that vehicle. This apparatus, which may have internal and external antennas, could enable a variety of advanced effects such as localized GPS and command and control link spoofing and jamming as well as providing a vehicle for signal intercept and intelligence solutions. Additionally, due to the shielding properties of the arresting and containment device, semi-destructive means such as localized EMPs could be used to damage the encapsulated unmanned vehicle electronics.

18 Claims, 6 Drawing Sheets

(56) References Cited

U.S. PATENT DOCUMENTS

| | | | |
|---|---|---|---|
| 2005/0166441 A1* | 8/2005 | Mattox | A01M 23/00 43/1 |
| 2007/0158498 A1* | 7/2007 | Snediker | B64F 1/02 244/110 F |
| 2010/0181424 A1* | 7/2010 | Goossen | F41H 13/0006 244/110 F |
| 2011/0148703 A1* | 6/2011 | Hayles, Jr. | G01S 3/30 342/367 |
| 2015/0360797 A1* | 12/2015 | Melish | B64F 1/025 244/110 C |
| 2016/0251088 A1* | 9/2016 | Melish | B64F 1/02 244/110 C |
| 2016/0376029 A1* | 12/2016 | Sekiya | F41H 11/02 244/110 F |
| 2017/0144756 A1* | 5/2017 | Rastgaar Aagaah | B64C 39/024 |
| 2017/0356726 A1* | 12/2017 | Theiss | B64C 39/024 |

* cited by examiner

SYSTEM AND METHOD FOR ARRESTING AND NEUTRALIZING UNMANNED VEHICLES

PRIORITY CLAIM UNDER 35 U.S.C. § 119(e)

This patent application claims the priority benefit of the filing date of provisional application Ser. No. 62/302,863 having been filed in the United States Patent and Trademark Office on Mar. 3, 2016 and now incorporated by reference herein.

STATEMENT OF GOVERNMENT INTEREST

The invention described herein may be manufactured and used by or for the Government for governmental purposes without the payment of any royalty thereon.

BACKGROUND OF THE INVENTION

This invention relates generally to unmanned vehicles and systems and methods for neutralizing them with a focus on capture apparatuses employing materials with radio frequency shielding properties so as to sever communications between a target vehicle and its operator, and enable a friendly operator's physical acquisition and command and control takeover of that vehicle.

With the widespread commercial availability of unmanned vehicles (both remote controlled and autonomous), a potential for improvised threats has never been higher. Swarm technology, that uses multiple vehicles working in conjunction with each other, produces the possibility of an even larger collective threat. Unmanned vehicles for ground, sea, and air applications present an unprecedented opportunity as vessels for improvised threats that can include explosive, chemical, radiological, biological, and electronic warfare devices. In some cases, destroying vehicles carrying these payloads may aid in dispersal of the biological, chemical, or radiological agents over an area. In these instances, destruction would not be the preferred approach to neutralizing the threat.

A need exists for a comprehensive, safe, and affordable solution for countering these cheap, highly available threat-bearing unmanned vessels. It is understood amongst the policy-making community that the misuse of commercially available drones is one of the top safety issues facing a variety of locations around the country. There have been numerous attempts at various techniques for detecting drone threats and mitigating those threats, but none of them offer all-encompassing solutions. Sensitive sites may require the examination of multiple fields of technology development and a layered approach to provide adequate protection.

Currently proposed and existing systems fall short of offering layered solutions that cover the taxonomy of potential unmanned vehicle threats. They often amount to destroying the vehicles with superior firepower—something not appropriate for domestic use due to concerns over collateral damage, or capturing the vehicle with a simplistic net, which does little to mitigate the risks associated with using the vehicles for surveillance or arming them to be remotely activated threats.

Using destructive force to eliminate an unmanned aerial vehicle (UAV) or "drone" threat can create a serious problem due to falling debris and collateral damage. On the other hand, simple interference methods do not mitigate the threat posed by drones that navigate to pre-defined waypoints. The only interference-based way to achieve the latter would be to transmit signals that interfere with GPS, however the FCC prohibits interference with approved devices as it can create other high level risks to public safety. It is thought that the best way to defeat such a threat is a cyber or electronic defense solution that could allow for control of the threat target to be acquired by a friendly operator. A comprehensive solution should allow for multiple alternative destructive and non-destructive means of disabling the unmanned vehicle, to be utilized on a case-by-case basis. The rules of engagement for solutions such as this would permit an escalation of force approach in response to the perceived intent of the unmanned vehicle.

In U.S. Pat. No. 9085362 B1, a deployable net capture apparatus is disclosed that would enable the interception of an unmanned vehicle through a deployment mechanism using a basic net to ensnare the target vehicle. This method has a few shortfalls. While the apparatus disclosed in U.S. Pat. No. 9085362 B1 creates a non-destructive means for UAV mitigation, it fails to mitigate threats from a UAV that might be equipped with self destructive features that could potentially be triggered by remote control via wireless signals or autonomously based on reaching a given GPS waypoint. Such a destructive force could not only still enable the payload to be triggered, but may result in the damage or destruction of the capturing aircraft as well.

U.S. Pat. No. 9085362 B1 additionally falls short of providing a solution that could enable signal intelligence and reconnaissance on a captured UAV if it somehow fell out of the capture net. While U.S. Pat. No. 9085362 B1 is non-destructive, it fails to provide a means for cyber and electronic countermeasures which could be used to target specific systems of the vehicle with destructive effects. Finally, U.S. Pat. No. 9085362 B1 fails to address threats posed by non-airborne vehicles such as small RC cars and/or boats. While these pose less of a risk currently, a suitable solution for countering them should still be examined and considered.

OBJECTS AND SUMMARY OF THE INVENTION

It is therefore an object of the present invention to provide a system for arresting and neutralizing unmanned vehicles.

It is a further object of the present invention to provide a system for arresting unmanned aerial vehicles, unmanned ground vehicles, and unmanned watercraft.

It is still a further object of the present invention to provide a system to both physically and electronically isolate unmanned vehicles.

It is yet still a further object of the present invention to provide a system to electronically spoof or to electronically destroy an unmanned vehicle.

It is yet another object of the present invention to provide a system for arresting and neutralizing unmanned vehicles which is deployable from an unmanned aerial vehicle.

Briefly stated, the present invention achieves these and other objects through the use of shielded material in a deployable vehicle arresting and containment device that, when used for the interception of an unmanned vehicle, effectively achieves RF isolation of that vehicle, breaking all external communications with that vehicle. The arresting and containment device, which may have internal and external antennas, could enable a variety of advanced effects such as localized GPS and command and control link spoofing and jamming as well as providing a vehicle for signal intercept and intelligence solutions. Additionally, due to the shielding properties of the arresting and containment device, semi-destructive means such as localized EMPs could be used to damage the encapsulated unmanned vehicle electronics.

An embodiment of the present invention, a system for arresting and neutralizing unmanned vehicles, comprises an unmanned aerial vehicle having an arresting means being deployable from the unmanned aerial vehicle, where the arresting means features a physical containment means and an electrical isolation means and a means for attaching and for effectuating the deployment of the arresting means.

In the same embodiment of the present invention, the electrical isolation means features layers of radio frequency absorptive materials, conductive materials, and structural supportive materials.

Still in the same embodiment of the present invention, the physical containment means features an open end being both weighted and magnetized to effectuate closure of the open end and envelopment of the unmanned vehicle.

Still yet in the same embodiment of the present invention, the means for weighting contain internal compartments for payloads capable of electronic spoofing or destruction of said aerial vehicle.

Another embodiment of the present invention, a method for arresting and neutralizing unmanned vehicles, comprises the steps of maneuvering an unmanned aerial vehicle within proximity of an unmanned vehicle, deploying, via an attachment means, an arresting means from the unmanned aerial vehicle onto the unmanned vehicle; physically entrapping the unmanned vehicle within the arresting means; and electrically isolating the unmanned vehicle within the arresting means.

DETAILED DESCRIPTION OF THE PREFERRED EMBODIMENT

Figure 1:
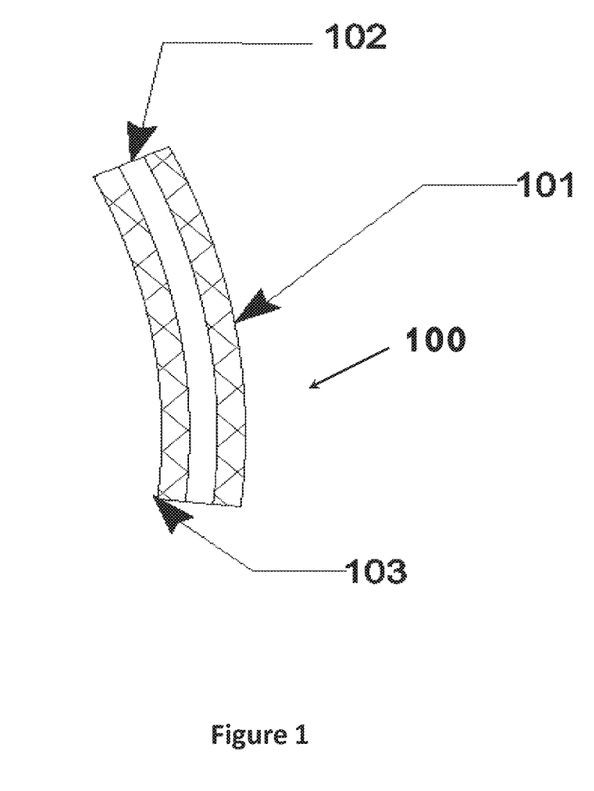
FIG. 1 depicts a cross-sectional view of an exemplary embodiment of the RF isolating containment unit of the present invention.

Referring to FIG. 1, a cross section of the construction of an exemplary embodiment of the RF Isolating Containment Unit (hereinafter RF ICU) 100 of the present invention is depicted. A layer of suitable conductive material 101 shields radio frequency signals from propagating in or out of the enclosed RF ICU 100. Additional layers of suitable supportive materials 102 that may have radio frequency absorptive properties and suitable conductive materials 103 may be added to increase the physical strength of the RF ICU 100 and increase the attenuation of radio frequency signals passing through it.

This embodiment of the present invention provides adequate radio frequency shielding and physical strength to achieve its two primary goals: capture a target unmanned aerial vehicle, and to drastically reduce the probability of reception of any outside radio frequency signals. Reducing the reception of outside radio frequency signals aids in the prevention of remote detonation of the device and also prevents control or video feedback to the place of origin of the captured unmanned aerial vehicle. Certain RF ICU 100 design trade-offs within the scope of the present invention may be made to ensure that the conductive and supportive materials provide adequate attenuation at the desired frequency without creating excessive air resistance for launching the RF ICU 100.

Figure 2:
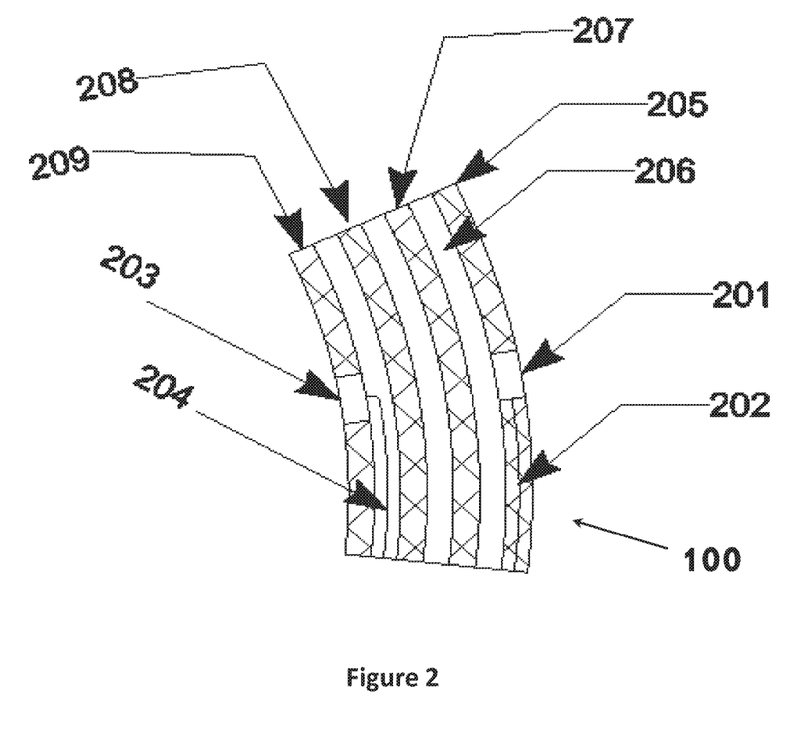
FIG. 2 depicts a cross-sectional view of an exemplary embodiment of the RF isolating containment net of the present invention, outfitted with both internal and external antennas to be able to send and receive any information while still attenuating exterior signals.

Referring to FIG. 2 depicts an exemplary embodiment of a structural cross section of the RF ICU 100 containing features for radio frequency communications. An external antenna 201 is attached along the outermost layer of shielding material of the RF ICU's 100 net 205 for communications with the ICU's 100 signal cable 202. An internal antenna 203 and corresponding signal cable 204 run along the innermost layer of the RF ICU 100. Cables 202 and 204 can be run along the shielded layer, as shown with 202, run along shielding layer 205, run between shielded layers as shown with 204, or run between shielding layers 208 and 209. These layers may be stacked as depicted with alternating material layers 205, 206, and 207. The internal and external antennas could potentially use shielded layers between them as ground planes as well. Additionally, circuitry could be created along the internal support materials.

This embodiment would allow for signals to and from the "hostile" UAS to be intercepted by the friendly UAS platform and/or equipment in the net 205 weights (see 304, FIG. 3) or embedded within the net 205 as well as allowing for "friendly-generated" signals to be sent back to the hostile UAS. The placement of a plurality of antennas 203 inside the RF ICU's 100 net 205, with isolation between the UAS system and the outside environment, allow for spoofed friendly signals to be sent to the hostile UAS and command structure at its point or origin. Additionally, due to the isolation provided by the radio frequency containment provided by the present invention, high powered RF signals could be broadcasted inside the RF ICU's 100 net 205 in an attempt to damage the hostile craft's RF hardware.

Figure 3:
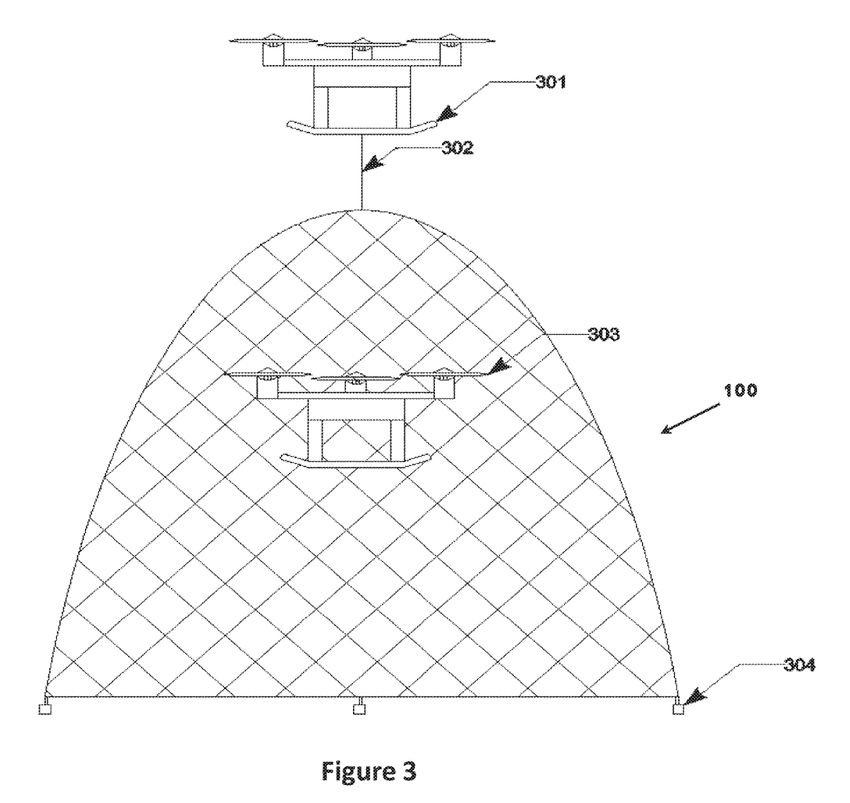
FIG. 3 depicts an exemplary embodiment and use case of the system as a net to capture one target unmanned aerial vehicle from another unmanned aerial vehicle.

FIG. 3 depicts an exemplary embodiment of a use case for the RF ICU System. A friendly UAS platform 301 deploys the RF ICU 100 on target UAS platform 303 using a suitable deployment system. This deployment system may be aerial or ground based and may include launching, dragging, or dropping approaches. The RF ICU 100 may contain an optional tether 302 to the friendly UAS platform 301, for steering and guiding the RF ICU 100 as needed. This tether 302 would allow for a slower and controlled rate of decent of the net upon the target vehicle 303, giving time for the more advanced effects to work prior to the device being brought to the ground, although these effects could still be utilized on a grounded UAS. A plurality of optional weights, 304, placed along the edges of the RF ICU 100 could allow the RF ICU 100 to bring the hostile UAS system 303 to the ground and could also serve as buses for payloads for more advanced cyber and electronic effects.

Figure 4:
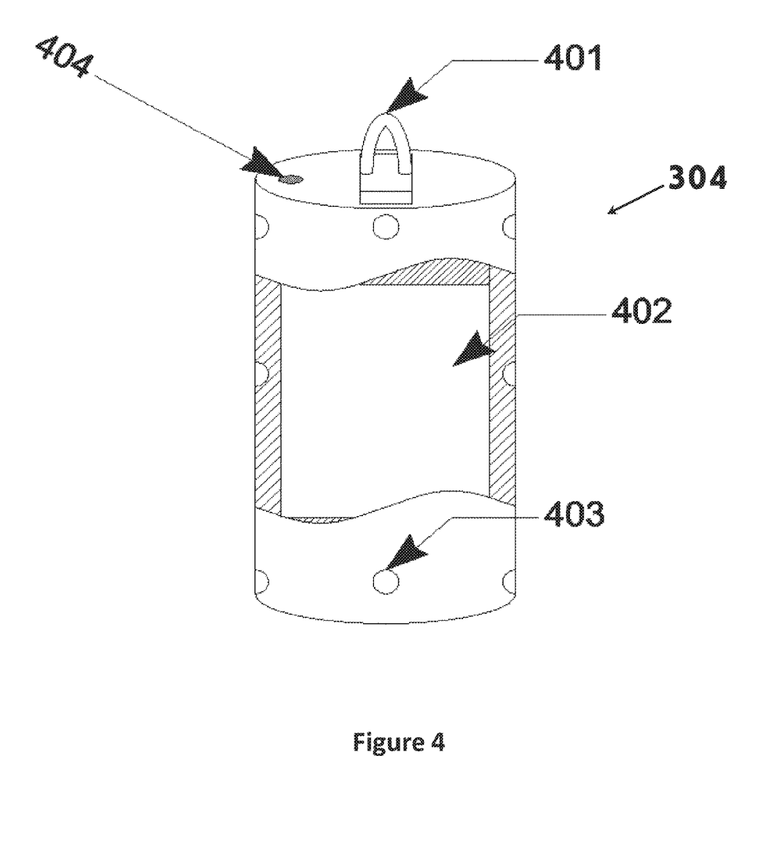
FIG. 4 depicts a view of the optional electronic payloads to enable the net to serve various functions in neutralizing and/or commandeering a target unmanned aerial vehicle.

FIG. 4 shows an exemplary embodiment of the aforementioned weights 304 being attached to the RF ICU 100 via a suitable connector at 401. Any payloads for advanced effects would be placed inside the hollowed out center 402 of the weight 304 with any required connection to the RF ICU 100 being fed through a plurality of cable feed throughs 404. The outside of the weight 304 may contain a plurality of magnets 403, allowing the weights 304 to easily link together beneath the target platform 303, ensuring that the RF ICU 100 closes beneath it so it cannot communicate outward. The payloads inside the weights 304 could include anything from power sources to communications and computation equipment.

Figure 5:
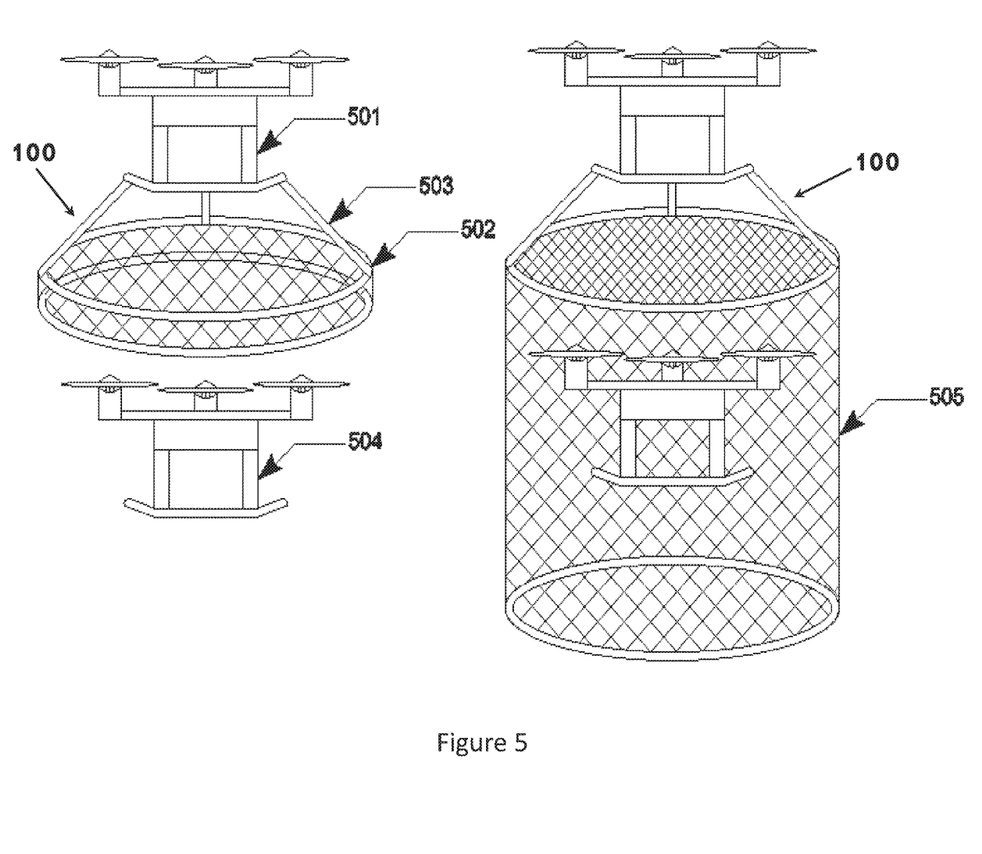
FIG. 5 depicts an exemplary embodiment of the RF ICU of the present invention being used as an RF isolating cage that could be lowered down around a target unmanned aerial vehicle without necessarily removing it from the sky.

FIG. 5 depicts an exemplary embodiment of the system, using the RF ICU 100 as incorporating a cage 502 around the target UAS 504. The friendly UAS 501 is attached to the yet un-deployed RF ICU cage 502 by an optionally detachable support 503. Once the target UAS 504 is targeted and found capable of being encased by the deployed cage 505, it deploys. In this embodiment, the deployed RF ICU cage 505 surrounds the target UAS 504 on all sides but the bottom and extends well past the bottom of the target UAS 504 to prevent signals from all but the steepest angles from penetrating. Additionally, the support 503, may detach from the friendly UAS 501, allowing it to drop onto the target UAS 504, and bring it to the ground, similar to a net.

The goal of this embodiment would be to allow a deployed cage 505 to drop around the target UAS 504, isolating it physically, without necessarily having it drop to the ground. This would allow electronic and cyber effects to be used on the platform while still keeping the target platform airborne. The deployed cage 505 could then be steered using the friendly UAS 501, allowing for continued isolation of the target UAS 504.

Figure 6:
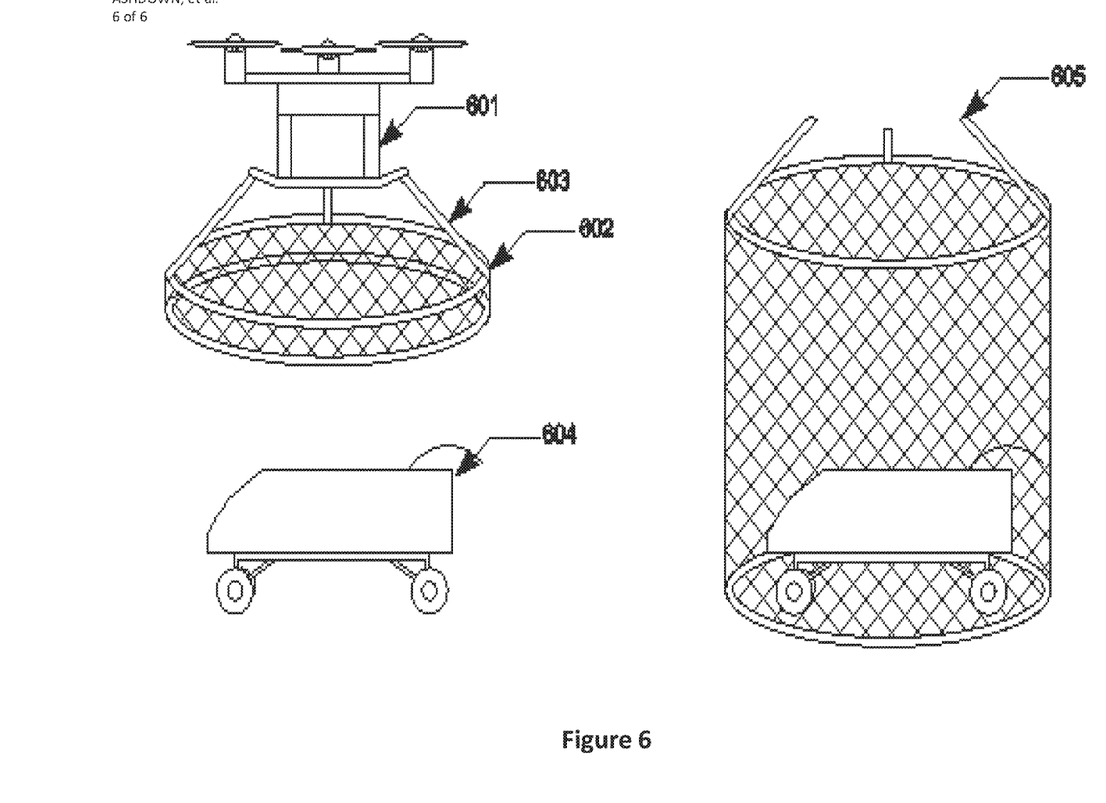
FIG. 6 depicts an exemplary use case for the RF ICU of the present invention for non-aerial target vehicles.

FIG. 6 depicts an exemplary use case where the present invention is used to capture a target ground vehicle 604. The friendly UAS 601 is attached to the yet un-deployed RF ICU 602 by a support structure 603. Once the target ground vehicle 604 is located and it is determined that it can be encased by the RF ICU 602, it deploys. The deployed and detached net or cage 605 surrounds the target ground vehicle on all sides preventing signals from reaching the vehicle. The net or cage 605 could also be suspended from a longer support structure 603 and have a top rather than bottom opening and be used to ensnare the target ground vehicle 604 (more optimal for radio controlled watercraft) while still providing the isolating structure.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A system for arresting and neutralizing unmanned vehicles, comprising:
   a friendly unmanned aerial vehicle;
   a substantially rigid containment unit being deployable from said friendly unmanned aerial vehicle to enclose a hostile unmanned aerial vehicle, said substantially rigid containment unit including at least one layer of conductive material, said at least one layer of conductive material operable to shield radio frequency signals from propagating into said substantially rigid containment unit; and an attachment means for effectuating said deployment.

2. The system of claim 1, wherein said substantially rigid containment unit includes a closed end proximate to said attachment means, an open end distal to said attachment means, and a plurality of weights adjacent to said open end having magnets for closing said open end, at least one of said weights including a payload compartment comprising electronic countermeasures, wherein said electronic countermeasures are electrically connected to an interior of said arresting means so as to transmit radio frequency spoofing signals thereto and receive radio frequency spoofed signals therefrom, respectively.

3. The system of claim 1, further comprising an external antenna disposed along an outermost layer of said substantially rigid containment unit and an internal antenna that is electrically connected to said external antenna and disposed along an innermost layer of said substantially rigid containment unit, said external antenna and said internal antenna configured for intercepting signals sent to and from said hostile unmanned aerial vehicle and for transmitting radio frequency spoofing signals to at least one of said hostile unmanned aerial vehicle and a hostile unmanned aerial system platform.

4. The system of claim 3, further comprising at least one layer of supportive material disposed between said external antenna and said internal antenna, said at least one layer of supportive material having radio frequency absorptive properties for increasing said substantial rigidity of said substantially rigid containment unit and for increasing attenuation of radio frequency through said substantially rigid containment unit.

5. The system of claim 1, wherein said attachment means includes a tether for connecting said substantially rigid containment unit to said friendly unmanned aerial vehicle, said tether configured for controlled lowering of said substantially rigid containment unit around said hostile unmanned aerial vehicle.

6. A method of arresting and neutralizing unmanned vehicles, comprising the steps of:
   maneuvering a friendly unmanned aerial vehicle within proximity of a hostile unmanned vehicle; and
   deploying, via an attachment means, a substantially rigid containment unit from said friendly unmanned aerial vehicle around said hostile unmanned vehicle, said substantially rigid containment unit including at least one layer of conductive material, said at least one layer of conductive material operable to shield radio frequency signals from propagating into said substantially rigid containment unit.

7. The method of claim 6, further comprising:
   transmitting and receiving radio frequency signals to and from said hostile unmanned vehicle for the purpose of spoofing.

8. The method of claim 6, wherein said substantially rigid containment unit further includes an external antenna disposed along an outermost layer of said substantially rigid containment unit and an internal antenna electrically connected to said external antenna and disposed along an innermost layer of said substantially rigid containment unit, the method further comprising:
   intercepting radio frequency signals sent from said hostile unmanned aerial vehicle using said internal antenna; and
   intercepting radio frequency signals sent to said hostile unmanned aerial vehicle using said external antenna.

9. The method of claim 8, further comprising transmitting radio frequency spoofing signals to said hostile unmanned aerial vehicle from said internal antenna.

10. The method of claim 8, further comprising transmitting radio frequency spoofing signals to a hostile unmanned aerial system platform from said external antenna.

11. The method of claim 6, wherein said substantially rigid containment unit further includes a layer of supportive material having radio frequency absorptive properties for increasing said substantially rigidity of said substantially rigid containment unit and for increasing attenuation of radio frequency through said substantially rigid containment unit.

12. The method of claim 6, wherein said attachment means includes a tether for connecting said substantially rigid containment unit to said friendly unmanned aerial vehicle, said deploying step including a controlled lowering of said substantially rigid containment unit using said tether.

13. A system for arresting and neutralizing unmanned vehicles, comprising:
a friendly unmanned aerial vehicle;
a substantially rigid containment unit being deployable from said friendly unmanned aerial vehicle to enclose a hostile unmanned aerial vehicle, said substantially rigid containment unit including:
at least one layer of conductive material operable to shield radio frequency signals from propagating in or out of the substantially rigid containment unit, and at least one layer of supportive, material having radio frequency absorptive properties for increasing said substantial rigidity of the substantially rigid containment unit and for increasing attenuation of radio frequency through said substantially rigid containment unit;
and an attachment means for effectuating said deployment.

14. The system of claim 13, wherein said at least one layer of supportive material is disposed interior to said at least one layer of conductive material.

15. The system of claim 13, further comprising an external antenna disposed along an outermost layer of said substantially rigid containment unit and an internal antenna that is electrically connected to said external antenna and disposed along an innermost layer of said substantially rigid containment unit, said external antenna and said internal antenna configured for intercepting signals sent to and from said hostile unmanned aerial vehicle and for transmitting radio frequency spoofing signals to at least one of said hostile unmanned aerial vehicle and a hostile unmanned aerial system platform.

16. The system of claim 13, wherein said attachment means includes a tether for connecting said substantially rigid containment unit to said friendly unmanned aerial vehicle and configured for providing a controlled lowering of the substantially rigid containment unit during said deployment.

17. The system of claim 13, wherein:
said substantially rigid containment unit includes a closed end proximate to said attachment means and an open end distal to said attachment means, said attachment means includes a support system for connecting said substantially rigid containment unit to said friendly unmanned aerial vehicle adjacent the closed end and providing a controlled lowering of the substantially rigid containment unit, and said deployment includes the controlled lowering of the substantially rigid containment unit to enclose said hostile unmanned aerial vehicle through said open end.

18. The system of claim 17, wherein said substantially rigid containment unit further includes a plurality of magnets disposed adjacent said open end for closing said open end after lowering said substantially rigid containment unit to enclose said hostile unmanned aerial vehicle.

* * * * *